April 2, 1957            A. G. THOMAS            2,787,719

STEP MOTOR AND CONTROL SYSTEM THEREFOR

Original Filed June 20, 1952

INVENTOR
Albert G. Thomas

April 2, 1957 A. G. THOMAS 2,787,719
STEP MOTOR AND CONTROL SYSTEM THEREFOR
Original Filed June 20, 1952 2 Sheets-Sheet 2
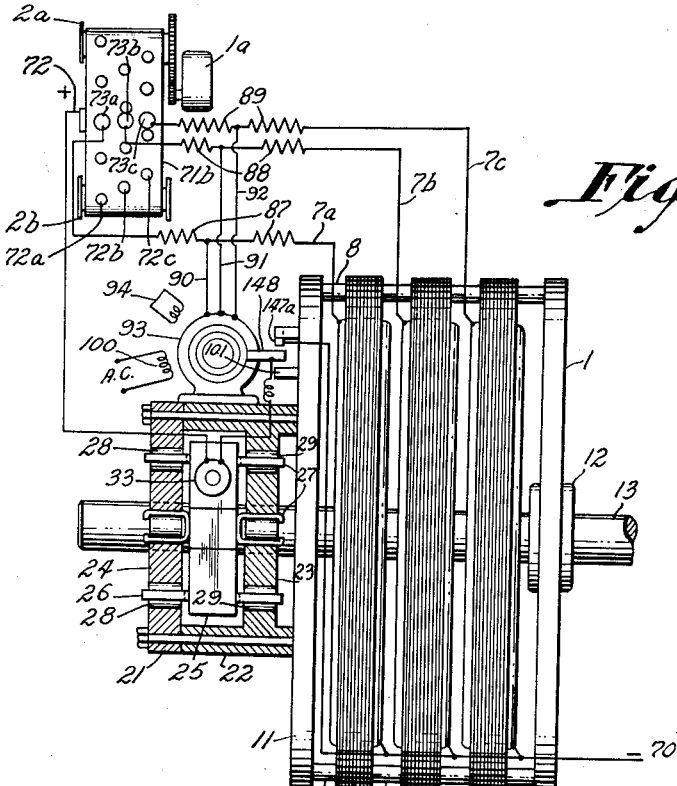
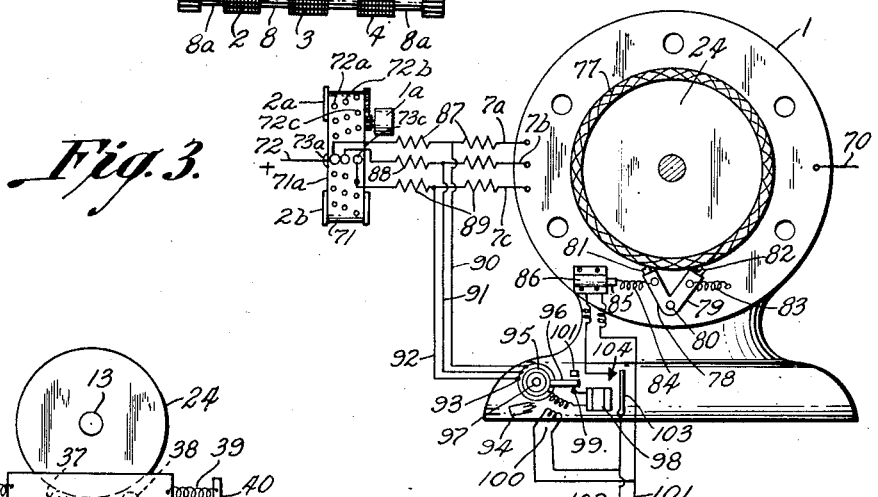
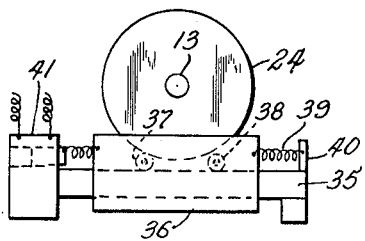
INVENTOR
Albert G. Thomas

United States Patent Office 2,787,719
Patented Apr. 2, 1957

2,787,719
STEP MOTOR AND CONTROL SYSTEM THEREFOR

Albert G. Thomas, Chattanooga, Tenn.

Original application June 20, 1952, Serial No. 295,694, now Patent No. 2,774,922, dated December 18, 1956. Divided and this application August 27, 1954, Serial No. 452,499

9 Claims. (Cl. 310—49)

This invention relates to electromagnetic devices generally and particularly to step motors and positioning devices. This application is a division from my copending application, Serial No. 295,694 filed June 20, 1952, now Patent No. 2,774,922, December 18, 1956.

In remote controls, calculating machines, textile and paper machinery, indexing operations, valve and other controls, instrument reading duplication, radar systems, gun pointing, automatic machine tool controls, and servomechanisms generally, it is often desirable to have electromagnetic step motors or positioning devices operate in unison or through predetermined displacements. This has been difficult to achieve with usual motors. My improved positioning device or motor, however makes possible remarkably stable and satisfactory operation for the above mentioned and other applications. I have found that this motor, used either as a step-by-step positioning device or motor, or as a synchronous motor, provides quite accurate and desirable predetermined displacements or speed control as desired.

An object is to provide a step motor with mechanical means for preventing or reducing rotor hunting or oscillations.

Another object is to provide a step motor with electrical means for preventing or reducing rotor hunting or oscillations.

A further object is to provide a step-motor with electrical or mechanical oscillation-reducing means which may be automatically or manually reversed when the rotor is reversed in direction of rotation.

An additional object is to provide means for reducing the field strength of the stator or rotor near the ends of step movements of the rotor, in order to reduce rotor oscillations.

Other objects will be evident in the following description.

In the drawings:

Figure 2a is a front view of the motor of Figure 1, showing circuit connections for the belt-modulated currents, and the brake solenoid control circuit as shown and described in connection with Figure 3.

Figure 3 is an end view of a step motor having three fields or stator elements and three phased rotor elements, and mechanical braking means electrically controlled to prevent rotor oscillations.

Figure 4 is an end view of a step motor and mechanism for damping rotor oscillations.

Figures 1, 2:
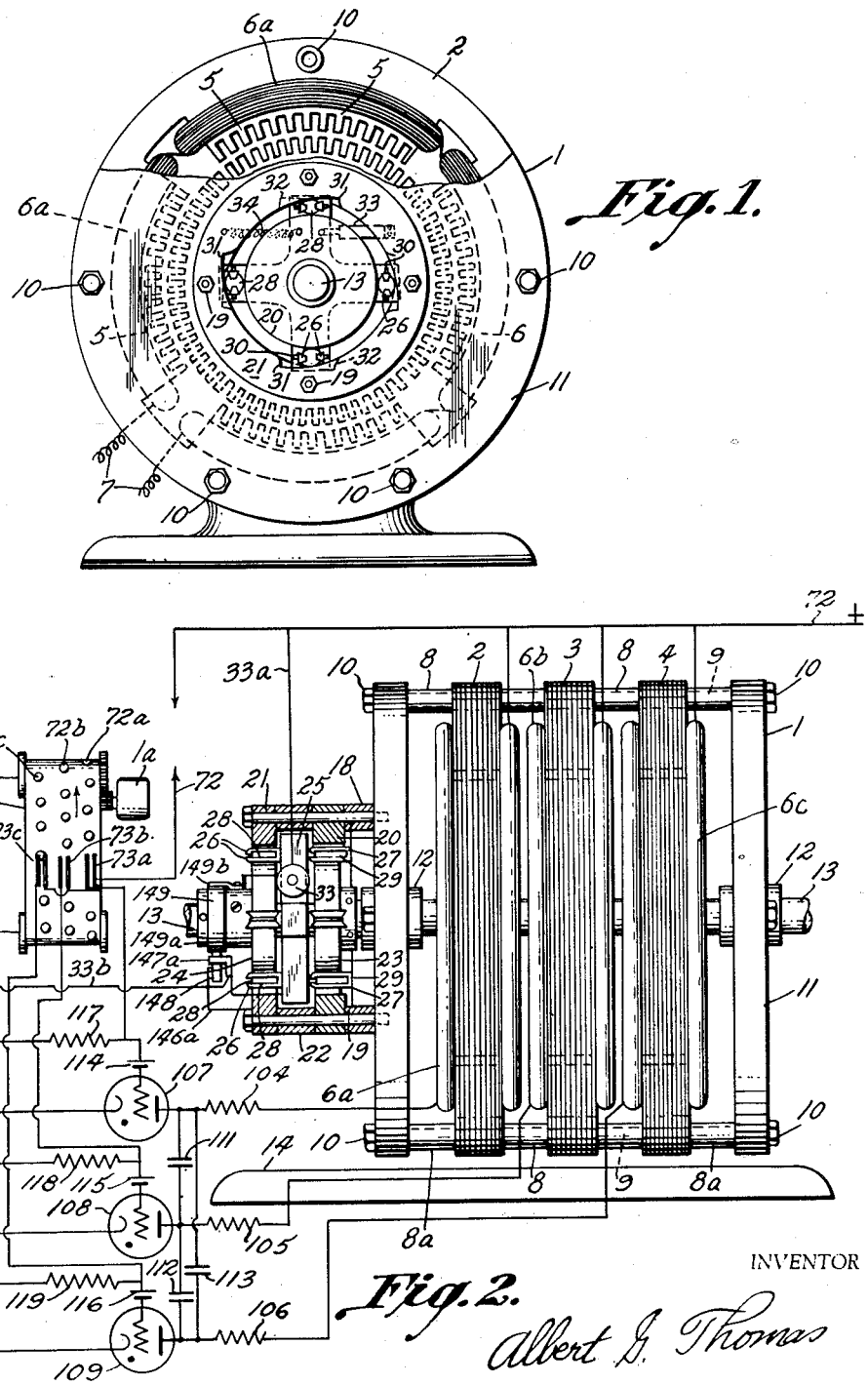
Figure 1 is an end elevation of a step motor with roller or ball type over-running clutches to prevent rotor oscillations, and with the cover shown broken away.
Figure 2 is a front view of the motor shown in Figure 1, and commutating means.

In Figures 1 and 2, motor 1 has three stator or field sections 2, 3 and 4 each of which has a plurality of groups of magnetizable teeth 5 which are of equal width circumferentially and are spaced apart one tooth width. Four groups of teeth are shown but each stator may have any desired number of groups. Each group of teeth is wound with a magnetizing coil or winding 6 which is suitably held in place by straps or otherwise. These windings are shown connected in series for any one stator section and have terminal conductors 7 but they can be connected in parallel or series-parallel if it is desired to reduce self inductance.

The three stator units or sections are preferably laminated and are clamped against sleeve separators 8 by means of bolts 9 passing through the sleeves and holes through the stators and end plates 11 which have attached bearings 12 for rotor shaft 13 and which are rigidly clamped to bored supports 8a. The bolts are held by nuts 10.

The teeth 5 of the three stator sections or groups are in alignment with respect to a plane passing through the axis of shaft 13 and the three toothed rotor sections, not shown, are fastened to shaft 13 in axial positions so that they will be in proper axial alignment with the respective stator sections. These rotor sections are provided with uniformly spaced magnetizable radial teeth of the same circumferential width as the adjacent stator teeth and of the same spacing so that the rotor teeth can be brought into circumferential alignment with the stator teeth. The teeth of each rotor group or section are, however, phased with respect to the teeth of the other rotor section so that when any stator group winding is energized to bring associated rotor teeth into alignment with the teeth of that stator group, rotor teeth of the next group or section to be energized will then overlap the associated stator teeth of that section by one third tooth width in the direction of rotation. In this way the effective rotor teeth are always in position to be magnetically pulled into alignment with the teeth of the respective stator sections as they are energized in repeated order. The rotor is caused to revolve in this manner. The winding means for any one of the three groups is considered as applied to the magnetization of one whole field section or unit and its associated rotor unit, there being three groups or units in the motor, although there could be any number of units or phases.

While the windings are shown on the stator sections, it is obvious that the rotor sections could be wound instead of the stator or stators, or both can be wound. It is preferable that the rotor and stator laminations be made of silicon steel or other metal of good magnetic permeability and relatively high resistance to eddy currents. It is preferable also to insulate the clamping bolts from the laminations.

Metal ring 18 is bored so that a plurality of bolts 19 can be passed through it and screwed into threaded holes suitably positioned in the face of adjacent end plate 11. Bolts 19 are also passed through similarly spaced holes in cam ring 20 and outer cam ring 21 which have a spacing shoulder 22 as shown. These cams are therefore firmly clamped to end plate 11 in register with hardened steel discs 23 and 24 which are rigidly fastened to motor shaft 13 coaxially therewith, by means of suitable integral hubs and set screws or keys. The discs are therefore rotated with the shaft.

Cross-shaped piece 25 is centrally bored and is rotatably supported on shaft 13 between discs 23 and 24. The arms of this crosspiece have attached arcuate strips 26 extending perpendicularly from one face and similar strips 27 extending perpendicularly from the opposite face. These strips may be rigid or resilient and are turned over at the free ends to limit axial movement of rollers 28 nested between strips 26, and rollers 29 nested between strips 27. In case the strips are rigid they can be slotted in axial direction and strip springs 30 (Fig. 1) attached thereto can press the rollers so that resilient movement of these rollers within the bounding strips is possible. The strips may be anchored in curved slots in the faces of crosspiece 25 and the rollers are in contact with the peripheries of the respective associated discs 23 and 24. Strips 26 and 27 are narrower than the diameter of the rollers so that rollers 28 can be brought into contact with cam surfaces 31 of cam ring 21 and rollers 29 can be brought into contact with oppositely inclined cam surfaces 32 of cam ring 20. The resilient strips assure that each roller 28 will be pinched between disc 24 and a cam surface 31 when crosspiece 25 is rotated sufficiently in counterclockwise direction as viewed in Figure 1. This then allows rotation of shaft 13 and disc 24 in clockwise direction but not in the reverse direction.

Similarly, rollers 29 which ride on disc 23 will be pinched between that disc and cam surfaces 32 to prevent rotation of shaft 13 and disc 23 in clockwise direction when crosspiece 25 is urged in clockwise direction by solenoid 33 the armature of which is attached to crosspiece 25 and the winding of which is attached to ring 21. Tension spring 34, attached to ring 21 and crosspiece 25 normally urges the crosspiece and supported rollers in counterclockwise direction so that rollers 28 are wedged against cam surfaces 31 and rollers 29 are moved out of contact with cam surfaces 32. Normally, therefore, shaft 13 may be revolved in clockwise direction but not in the reverse direction. If it is desired to lock the shaft against clockwise rotation but to allow counterclockwise rotation, then solenoid 33 is energized by a suitable current so that crosspiece 25 is rotated clockwise until rollers 29 are wedged against cam surfaces 32 and rollers 28 are released.

Assuming that the three stator sections are energized in proper order to cause clockwise rotation of shaft 1 in steps, as viewed in Figure 1, then it will be seen that as the various rotor sections are magnetically snapped into alignment with the respective stator sections, there would be rotor oscillation if some means were not provided to prevent it. This is accomplished by locking the rotor against reverse swing, by means of rollers 28 and cooperating cam surfaces 31 and disc 24. The rotor is magnetically snapped forward and is locked substantially in the most forward position, the locking occurring when the rotor is virtually at standstill, so that shock is avoided. The magnetic pull on the rotor, tending to pull the effective rotor teeth back into alignment with the associated stator teeth then serves to hold the rotor in fixed positions until the next succeeding stator section is energized to pull the rotor forward another step. I have found that this oscillation prevention means is quite practical and effective in operation.

As shown in Figure 4, it is possible to use only one braking or locking disc for both directions of rotation. Disc 24 is attached to shaft 13 as before. Bar 35 is bolted to the framework of the motor and supports slidable carriage 36 carrying rollers 37 and 38. The carriage is normally pulled to the right by tension spring 39 fastened to the carriage and to extension 40 from bar 35. Roller 37 is therefore normally wedged between disc 24 and bar 35. Similarly, when solenoid 41 is energized, its armature pulls carriage 36 to the left by means of a stiff spring connection so that roller 37 is moved away from disc 24 and roller 38 is wedged between disc 24 and bar 35 to prevent rotation of the disc and shaft in clockwise direction. Solenoid 41 is attached to bar 35.

In this specification like numerals will be used to designate like parts, where practicable.

Figure 2 shows a tape or belt type distributor to supply current to the windings 6a, 6b, and 6c of the three motor sections 2, 3, and 4, respectively. Motor 1a, through suitable gearing, drives belt or tape 71b made of rubber, plastic, or other insulating material. Lines of individual contacts 72a, 72b, and 72c are fastened to the belt by cement, printing, or in any suitable manner as by molding, electro-deposition, or the like. These contacts may be made of thin metal or other conductive material or they may comprise metallic coatings or paint sprayed on or painted on the belt. They could likewise comprise carbon or metal powder pressed into the belt or otherwise attached.

The belt is rolled over reels 2a and 2b between which is a suitable supporting surface beneath pairs of spaced flexible brushes 73a, 73b, 73c which are fixed to a support (not shown) and which are arranged at an angle to allow the belt to slip beneath them in the direction of the arrow. These brushes may be resilient metal strips and are arranged in adjacent pairs which are connected in the circuit as illustrated. Normally no current will pass from one member of a pair to the other member when the insulating belt is passing beneath but when a conductive contact element 72a, 72b, or 72c bridges an associated pair of brushes which are urged against the belt, current will then be conducted through the respective brush pair to the grid circuit of one of the thyratrons 107, 108, or 109. Thyratron 107 is connected in series with field winding 6a and resistor 104, between negative lines 70 and positive line 72, as shown. Similarly, field winding 6b is connected in series with resistor 105 and thyratron 108 from positive supply line 72 to negative supply line 70; and field winding 6c is connected in series with resistor 106 and thyratron 109, between lines 72 and 70 as indicated. Quenching condensers 111, 112, and 113 are connected between the anodes of thyratrons 107—108, 108—109, and 107—109, respectively. These condensers, in conjunction with resistors 104, 105, and 106, serve to extinguish any conducting thyratron when any other thyratron is fired.

Resistor 117 is connected between negative line 70 and the positive terminal of bias battery or other source 114 the negative termial of which is connected to the grid of thyratron 107. Similarly, resistor 118 is connected in series with bias battery 115, between the grid of thyratron 108 and line 70, and resistor 119 is connected in series with bias battery 116 between the grid of thyratron 109 and line 70. The thyratrons are normally biased sufficiently negatively so that they do not fire.

The right hand brushes of the pairs 73a, 73b, and 73c are connected together and to line 72. The left brush of the pair 73a is connected to the positive terminal of battery 114, and similarly, the left brushes of the pairs 73b and 73c are connected, respectively, to the positive terminals of batteries 115 and 116.

Metal collar 149 having attached contact arm 148 is held laterally on shaft 13 by means of collar 149a fastened to the shaft. Collar 149 has a slipping connection with the shaft, friction being provided by spring strip 149b which is fastened at one end to a fixed collar on the shaft. Stop member 146a, of insulation material and shaped as indicated, is attached to ring 21. This member acts as a stop for contact arm 148 when the motor is rotating in forward direction, and metal contact member 147a, attached to member 146a limits movement of arm 148 when the motor is rotating in reverse direction. One terminal of solenoid 33 is connected to line 72 by conductor 33a and the other terminal of the solenoid is connected to a brush having rubbing contact with the collar supporting spring strip 149b. Contact member 147a is connected to line 70 by conductor 33b.

In operation, motor 1a is energized from lines 72 and 70 or another suitable source so that belt 71b is moved in the direction of the arrow, at uniform speed if desired. It will be seen that a contact 72a will first bridge brush pair 73a with the result that current will flow through resistor 117 in a direction to bias the grid of thyratron 107 positively to fire that thyratron supplying current to windings 6a. As the belt moves, a contact 72b will next bridge brush pair 73b to cause current to flow through resistor 118 to fire thyratron 108. When this happens thyratron 107 will be extinguished, through the agency of condenser 111 and consequently windings 6b will be energized to cause the rotor of motor 1 to move another step forward. Then a contact 72c bridges brush pair 73c with the result that current is passed through resistor 119 and thyratron 109 is fired, thyratron 108 being simultaneously extinguished by means of condenser 112. Then the cycle is repeated; each time a thyratron is fired the rotor moves one step forward.

If it is desired to reverse the direction of rotation of motor 1, the rows of contacts 72a, 72b, and 72c will be reversed in their order of striking their respective brush pairs so that brushes 73c will be bridged before brushes 73b and the latter will be bridged before brushes 73a. This arrangement of the contacts is shown on the belt just above reel or spool 2b. If it is desired that motor 1 remain stationary the belt will have no contacts, the current through the last fired thyratron holding the motor magnetically locked in position. I have found that greater magnetic locking action is provided when one thyratron remains fired rather than when two or three are fired. Assuming a constant speed of belt 71b, the speed of revolution of the rotor of motor 1 will be inversely proportional to the lengthwise spacing of the contacts along the belt.

As long as shaft 13 is rotated in forward or clockwise direction, as seen in Figure 1, contact arm 148 is held down against insulating member 146a since the rotating shaft 13 will, through friction, tend to carry arm 148 in the same direction. Rollers 28 are then effective to prevent back-swing of the rotor. When, however, shaft 13 is rotated in reverse direction, arm 148 is brought up against contact member 147a with the result that solenoid 33 is electrically connected with lines 72 and 70 and accordingly, the solenoid armature pulls cross member 25 toward the solenoid so that rollers 29 are made effective to prevent back-swing when the motor is rotating in reverse direction; as described elsewhere in the specification. Amplifying mechanism can be used to close the contacts after very small movement of the shaft so that rollers 28 will not lock against reverse rotation.

The motor of Figure 2a is the same as that shown and described in Figure 1 except that contact arm 148 is operated by a selsyn motor 93 instead of by slipping ring 149 which is eliminated. The electrical connections are as shown in Figures 4 and 5. When the order of energization of the conductors is, say, 92—91—90, the selsyn will tend to rotate in one direction moving contact arm or relay arm 148 in a direction to close the contacts and so to energize solenoid 33, thereby setting the brake mechanism for counterclockwise rotation of shaft 13 as seen in Figure 1. When the order of energization of the conductors is 90—91—92, the selsyn motor reverses and arm 148 is rotated away from contact 147a and the solenoid circuit is opened, the spring then arranging the brake mechanism for reverse or clockwise rotation of shaft 13. The remaining construction and operation are as described in connection with Figures 1 and 3.

In Figure 3, motor 1 is constructed in similar manner to the motors shown in Figures 1, 2, and 2a, except that the braking or damping mechanism is different. Disc 24, which is attached coaxially to shaft 13 has brake band or friction material 77 closely fitted around its periphery and firmly attached by screws, rivets, cement, or by other means. Integral arms 78 and 79 form a relatively heavy V-shaped element which can be rocked about pivot 80 which comprises a bolt passing through a bore in the V-element and which is screwed into a threaded hole in the motor casing or frame. Recesses are provided in the ends of arms 78 and 79 and friction or brake elements 81 and 82 are pressed into these recesses. Elements 81 and 82 may be made of the same material as band 77. The arms and elements 81 and 82 are arranged at such an angle and are of such dimensions that element 81 will grip band 77 and will prevent rotation of disc 24 and the attached motor shaft in counterclockwise direction but will allow rotation in clockwise direction, when arm 78 is urged in clockwise direction about pivot 80. At the same time element 82 is moved out of engagement with band 77. Similarly, when arm 79 is yieldingly forced in counterclockwise direction about pivot 80, element 82 will be pressed against band 77 to prevent rotation of the motor shaft in clockwise direction but allowing rotation thereof in counterclockwise direction; and element 81 will be moved out of contact with band 77.

One end of tension spring 83 is attached to arm 79 and the other end of the spring is attached to the motor casing so that spring 83 normally pulls element 81 into yielding engagement with band 77. The normal or forward direction of rotation of the rotor is therefore in clockwise direction and the rotor is locked or braked against back-swing. For reverse rotation of the rotor the following means are provided. One end of stiff tension spring 84 is attached to arm 78 and the other end of the spring is fastened to armature 85 of solenoid 86 which is screwed to the motor casing. Spring 84 is considerably stiffer than spring 83 so that element 82 will be pulled against band 77 when the solenoid is energized, with the result that element 81 is brought out of engagement with band 77. In this case element 82 grips band 77 and prevents back-swing in clockwise direction but allows reverse or counterclockwise rotation. I have found that this mechanism is quite effective in causing smooth action of the motor in either direction.

In order to cause energization of solenoid 86 upon reversal of direction of rotation of the rotor, resistors 87, 88, and 89 may be connected in series with the three field supply conductors 7a, 7b, and 7c, and with distributor 71. Conductors 90, 91, and 92 are tapped into these resistors at suitable points, chosen to provide the required potential difference, and are connected to the three secondary terminals of self-synchronous or selsyn motor 93 the field or primary winding 94 of which is short-circuited as I have found that this provides greater power in the motor. This motor, however, could be a miniature of my step motors described. Collar 95, having attached contact arm 96, is suitably supported on motor shaft 97 and has slipping frictional engagement therewith through the agency of spring washers or otherwise. A stop is fastened to the end of the shaft to prevent the collar from sliding off. One terminal of relay coil 98 is connected with contact 99 suitably supported and insulated so that contact arm 96 may be brought down against it to close the circuit including the secondary of transformer 100 which may be of small power output. Stop 101 is provided to limit movement of arm 96 in a counterclockwise direction. The primary of transformer 100 is connected to A. C. line conductors 101 and 102, connected respectively to a terminal of solenoid 86 and to relay arm 103 which is pulled against relay contact 104 when the relay is energized. The relay is normally open for forward or clockwise direction of rotation of the rotor and shaft 13. Contact 104 is connected with the other terminal of solenoid 86.

In operation, the shaft of self-synchronous or similar motor 93 is caused to revolve in counterclockwise direction due to currents passed through conductors 90, 91, and 92 as a result of potential drops across resistors 87, 88, and 89, or tapped portions thereof, as distributor 71 feeds current to the field windings 6a, 6b, and 6c of motor 1, connected as shown in Figure 4 of my Patent 2,774,922. This causes arm 96 to be held against stop 101, due to the frictional slip connection. When the distributor is caused in any manner to reverse the order of current supply to the field windings in order to reverse the direction of rotation of motor 1, the order of current supply to the secondary windings of synchronous motor 93 is simultaneously reversed so that arm 96 is quickly brought down against contact 99 and relay coil 98 is energized so that relay armature or arm 103 is brought into engagement with contact 104 to cause energization of solenoid 86, resulting in arms 78 and 79 being quickly pulled over to move element 81 out of engagement with band 77 and quickly thereafter to bring element 82 into contact with band 77 to produce smooth operation of the motor in reverse direction. The braking or damping device is therefore automatically set for either direction of rotation of the shaft of motor 1.

The distributor 71 may be constructed as indicated in Figure 3. Belt 71a has a backing of thin metal or other electrically conductive material and is coated with rubber, plastic, or other non-conductive material. Contacts 72a, 72b, and 72c are connected with the metal back layer and preferably project through holes in the upper insulating layer until their surfaces are flush with the upper surface of the insulation material. These contacts may be of the same metal as the belt, or otherwise, and are arranged in parallel rows as indicated so that a contact 72c will first strike brush 73c connected to conductor 7c and then a contact 72b will strike brush 73b connected to conductor 7b, and finally a contact 72a will strike the remaining brush 73a connected to conductor 7a. When any brush is touched by a contact, line 72, which has rubbing contact with the metal portion of the belt, is connected to the associated field winding of the motor 1. The belt is movable over reels 2a and 2b, being suitably supported. Motor 1a drives reel 2a through suitable gearing, to move the belt in the direction of the arrow. Therefore, as the belt moves, the contacts are brought into connection with the brushes in proper order to cause rotation of motor shaft 13 in one direction unless the angle of the contacts is reversed as shown below the brushes. If this alignment of the contacts is used the motor 1 will reverse since the order of energization of the first and third motor sections will be reversed.

The speed of the motor 1 can be varied by changing the speed of movement of belt 71a, or by varying the spacing of the groups of contacts. The further apart the contacts are, lengthwise of the belt, the slower motor 1 will revolve, for any given speed of the belt. The contacts can be elongated to hold the energization of the motor windings for longer periods if desired. When it is desired to hold the motor stationary, magnetically locked, a continuous strip contact on the belt can be used.

This strip can be one of the three lines of contacts made continuous rather than as separate contacts. It is, of course, feasible to use a separate continuous line contact to cause energization of the solenoid operating the brake-shifting mechanism when it is desired that the motor be reversed. This will eliminate the necessity for using selsyn motors or the like.

The moving belt therefore feeds energy to the three motor sections in proper order to cause rotation, since the current energizes the three motor sections in order, the current passing from positive line 72, through the motor, and through negative line 70.

The motor circuit of Figure 3, or its thyratron equivalent, can be used for many controls such as automatic machine tool controls. In this case three motors can be used, one to shift the table of a milling machine, for instance; another motor to shift the cross head, and another to lift or lower the cutting tool. Nine rows of contacts on one tape can be used instead of three rows, so that the operation of all three motors can be synchronized by the tape. In this way, a three dimensional control can be utilized for reproducing any desired movement of machine parts of other devices such as gun tracking or positioning mechanism, radar devices, computers, and other devices.

Photoelectric cells can be used; the moving tape modulating the photocell currents by means of dark or clear spots in the transparent tape, or by means of punched holes in an opaque tape. Furthermore, spots of metallic paint on the tape can operate the thyratrons by change of capacitance in the grid circuits as the spots pass near small metal plates connected to the grids; or magnetic spots can be used to vary the grid charges as a result of varied magnetically induced currents.

What I claim is:
1. In combination, a step motor including a shaft and a rotor supported thereby, cam mechanism having two oppositely inclined surfaces attached to said motor, a brake wheel attached to said shaft and rotatable therewith, a rollable element adapted to be moved into contact with said brake wheel and either said cam surface to lock said wheel and rotor against rotation in one direction while allowing substantially free rotation in opposite direction, means for moving said rollable element against either cam surface, a resilient member attached to said means and motor for causing movement of said rollable element in one direction, and an electromagnetic device attached to said means and motor for causing movement of said rollable element in opposite direction.

2. In combination, a step motor including a shaft and a rotor supported thereby, cam mechanism having two oppositely sloped surfaces attached to said motor, a brake wheel attached to said shaft and rotatable therewith, a rollable element adapted to be moved into contact with said brake wheel and either said cam surface to lock said wheel and rotor against rotation in one direction while allowing substantially free rotation in opposite direction, a member pivoted to said motor and adapted to move said rollable element against either cam surface, a spring attached to said member and said motor for causing movement of said rollable element against one said cam surface, a solenoid attached to said motor, and a resilient element connecting the armature of said solenoid and said member for causing movement of said rollable element against the other cam surface.

3. The device as described in claim 2, said rollable element comprising a roller and said member having an attached cage for moving said roller.

4. The device as described in claim 2, said member being pivoted on said shaft.

5. In a step motor including a shaft and a rotor supported thereby, a brake wheel carried by said shaft, a bar fixed relative to said brake wheel, a member movable on said bar in a direction substantially at right angles to the axis of said shaft, said member carrying a rollable element adapted to strike said brake wheel and to lock it against rotation in one direction when said member is displaced in one direction, and said member carrying another rollable element adapted to strike said brake wheel to lock it against rotation in opposite direction, when said member is moved in opposite direction, a spring attached to said bar and said member to urge it in one direction, and an electromagnetic device attached to said bar and said member to urge it in opposite direction.

6. In a step motor having a shaft and a rotor supported thereby, a brake wheel carried by said shaft, a brake element pivoted to said motor and having two diverging arms, one of which is adapted to engage said brake wheel to lock it against rotation in one direction and the other of which is adapted to engage said brake wheel to lock it against rotation in opposite direction, a spring attached to said brake element and said motor to urge one said arm against the brake wheel, and an electromagnetic device for moving the other said arm against the brake wheel.

7. In a step motor having a shaft and a rotor supported thereby, a brake wheel carried by said shaft, brake mechanism settable for locking said wheel and shaft against rotation in one direction while allowing substantially free rotation thereof in opposite direction, electromagnetic means for setting said brake mechanism, a selsyn motor for controlling said electromagnetic means, and electrical means connecting said selsyn motor with said step motor to cause said selsyn motor to rotate in direction corresponding to the direction of rotation of said step motor.

8. The device as described in claim 7, said electrical means including a plurality of impedance elements connected in circuit with said step motor, and a plurality of conductors connecting said selsyn motor with a plurality of points intermediate the terminals of said impedance elements.

9. The device as described in claim 7, said electrical means including a plurality of impedance elements connected in circuit with said step motor, and a plurality of conductors connecting said selsyn motor and said impedance elements in a manner to provide potentials to energize said selsyn motor to urge rotation thereof when current traverses said impedance elements to cause rotation of said step motor.

References Cited in the file of this patent

UNITED STATES PATENTS

| | | |
|---|---|---|
| 843,287 | MacCoy | Feb. 5, 1907 |
| 1,301,050 | Hagman | Apr. 15, 1919 |
| 1,440,729 | French | Jan. 2, 1923 |
| 1,977,745 | Thompson | Oct. 23, 1934 |
| 2,213,108 | Pollard | Aug. 27, 1940 |
| 2,507,798 | Maxwell | May 16, 1950 |
| 2,515,944 | Bennett | July 18, 1950 |
| 2,537,770 | Livingston et al. | Jan. 9, 1951 |
| 2,567,422 | Camp | Sept. 11, 1951 |
| 2,651,746 | Gano | Sept. 8, 1953 |